United States Patent
Siler et al.

(10) Patent No.: US 7,629,287 B2
(45) Date of Patent: Dec. 8, 2009

(54) RECLAMATION OF A TITANOSILICATE, AND RECONSTITUTION OF AN ACTIVE OXIDATION CATALYST

(75) Inventors: Susan J. Siler, Lake Jackson, TX (US); Joseph D. Henry, Lake Jackson, TX (US); David L. Trent, Lake Jackson, TX (US); Larry N. Ito, Midland, MI (US); David G. Barton, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 286 days.

(21) Appl. No.: 11/794,416

(22) PCT Filed: Dec. 9, 2005

(86) PCT No.: PCT/US2005/044749

§ 371 (c)(1),
(2), (4) Date: Oct. 18, 2007

(87) PCT Pub. No.: WO2006/078367

PCT Pub. Date: Jul. 27, 2006

(65) Prior Publication Data

US 2008/0064591 A1 Mar. 13, 2008

Related U.S. Application Data

(60) Provisional application No. 60/644,391, filed on Jan. 14, 2005.

(51) Int. Cl.
*B01J 29/04* (2006.01)
*B01J 38/04* (2006.01)
*B01J 21/06* (2006.01)
*B01J 38/60* (2006.01)

(52) U.S. Cl. .......................... 502/242; 502/22; 502/23; 502/24; 502/27; 502/34; 502/38; 502/39

(58) Field of Classification Search .................. 502/22, 502/23, 24, 27, 34, 38, 39, 242
See application file for complete search history.

(56) References Cited

U.S. PATENT DOCUMENTS

| | | | |
|---|---|---|---|
| 4,297,134 A | 10/1981 | Yamada | |
| 4,522,928 A | 6/1985 | McVicker et al. | |
| 4,659,683 A | 4/1987 | Biffar et al. | |
| 5,403,801 A | 4/1995 | Kitamura et al. | |
| 5,965,754 A | 10/1999 | Clark et al. | |
| 6,031,116 A | 2/2000 | Bowman et al. | |
| 6,255,499 B1 | 7/2001 | Kuperman et al. | |
| 6,323,351 B1 | 11/2001 | Bowman et al. | |
| 7,273,941 B2 | 9/2007 | Strickler et al. | |
| 2002/0161250 A1* | 10/2002 | Bowman et al. | ............ 549/536 |
| 2003/0228970 A1 | 12/2003 | Sun et al. | |
| 2006/0113180 A1 | 6/2006 | Patrascu et al. | |

FOREIGN PATENT DOCUMENTS

| | | |
|---|---|---|
| EP | 0230949 A2 | 8/1987 |
| EP | 0712852 A1 | 11/1995 |
| GB | 1263360 | 2/1972 |
| IT | 1290847 B | 12/1998 |
| JP | 01189347 | 7/1989 |
| WO | WO 94/02245 | 2/1994 |
| WO | WO 9501461 | 1/1995 |
| WO | WO 98/00414 | 1/1998 |
| WO | WO 99/00188 | 1/1999 |
| WO | WO 99/39827 | 8/1999 |
| WO | WO 00/59632 | 10/2000 |
| WO | WO 00/59633 | 10/2000 |
| WO | WO 2005/102525 | 11/2005 |

OTHER PUBLICATIONS

A. Tuel, *Crystallization of titanium silicalite-1 (TS-1) from gels containing hexanediamine and tetrapropylammonium bromide*, Zeolites, vol. 16, pp. 108-117, 1996.

S. Gontier and A. Tuel, *Synthesis of titanium silicalite-1 using amorphous $SiO_2$ as silicon source*, Zeolites, vol. 16, pp. 184-195, 1996.

A. Tuel and Y. Ben Taârit, *Synthesis, characterization, and catalytic properties of titanium silicates prepared using phosphonium ions*, Zeolites, vol. 13, pp. 357-364, 1993.

A. Tuel, Y. Ben Taârit and C. Naccache, *Characterization of TS-1 synthesized using mixtures of tetrabutyl and tetraethyl ammonium hydroxides*, Zeolites, vol. 13, pp. 454-461, 1993.

(Continued)

*Primary Examiner*—Elizabeth D Wood

(57) ABSTRACT

A method of reclaiming a titanosilicate from a deactivated or spent oxidation catalyst containing a titanosilicate having deposited thereon one or more catalytic metals, such as gold, and optionally, one or more promoter metals, the method involving treating the deactivated catalyst with an oxidant; contacting the oxidant-treated catalyst with acid, preferably aqua regia; washing the titanosilicate to remove residual acid; and optionally drying and/or calcining. A method of reconstituting an active oxidation catalyst from a spent or deactivated oxidation catalyst, the method involving reclaiming the titanosilicate as noted above, and then depositing one or more catalytic metals and, optionally, one or more promoter metals onto the reclaimed titanosilicate.

24 Claims, No Drawings

OTHER PUBLICATIONS

A. Tuel, Y. Ben Taârit, *Synthesis and characterization of titanium silicalite TS-1 prepared using phosphonium ions*, Zeolites, vol. 14, pp. 272-281, 1994.

A. Tuel, Y. Ben Taârit, *Synthesis to TS-1 from titanosilicate gels containing TPAOH/TEAOH and TPAOH/NH$_4$OH mixtures*, Microporous Materials, vol. 1, pp. 179-189, 1993.

J. Sudhakar Reddy and Rajiv Kumar, *Crystallization kinetics of a new titanium silicate with MEL structure (TS-2)*, Zeolites, vol. 12, pp. 95-100, 1992.

J. Sudhakar Reddy and Rajiv Kumar, *Synthesis, Characterization, and Catalytic Properties of a Titanium Silicate, TS-2, with MEL Structure*, Journal of Catalysis, vol. 130, pp. 440-446, 1991.

M. A. Camblor, A. Corma and J. Pérez-Pariente, *Synthesis of titanoaluminosilicates isomorphous to zeolite Beta, active as oxidation catalysts*, Zeolites, vol. 13, pp. 82-87, 1993.

C. B. Dartt, C. B. Khouw, H.-X. Li and M. E. Davis, *Synthesis and physicochemical properties of zeolites containing framework titanium*, Microporous Materials, vol. 2, pp. 425-437, 1994.

A. Tuel, Y. Ben Taârit, *A new template for the synthesis of titanium silicalites with the ZSM-48 structure*, Zeolites, vol. 15, pp. 164-170, 1995.

S. Gontier and A. Tuel, *Synthesis and characterization of Ti-containing mesoporous silicas*, Zeolites, vol. 15, pp. 601-610, 1995.

Maria D. Alba, Zhaohua Luan and Jacek Klinowski, *Titanosilicate Mesoporous Molecular Sieve MCM-41: Synthesis and Characterization*, J. Phys. Chem., vol. 100, pp. 2178-2182, 1996.

Co-Pending U.S. Appl. No. 11/547,060, filed Sep. 28, 2006, Susan J. Siler and Joseph D. Henry, "Hydro-Oxidation of Hydrocarbons Using Catalyst Prepared by Microwave Heating;" equivalent to WO 2005/102525, published Nov. 3, 2005 (copy enclosed).

\* cited by examiner

RECLAMATION OF A TITANOSILICATE, AND RECONSTITUTION OF AN ACTIVE OXIDATION CATALYST

CROSS-REFERENCE TO RELATED APPLICATIONS

This application is a 371 filing of International Patent Application PCT/US2005/044749, filed Dec. 9, 2005, which claims the benefit of U.S. provisional patent application Ser. No. 60/644,391, filed Jan. 14, 2005.

BACKGROUND OF THE INVENTION

In one aspect, this invention pertains to the reclamation of a titanosilicate from a deactivated oxidation catalyst comprising a titanosilicate having deposited thereon one or more catalytic metals and, optionally, one or more promoter metals. In another aspect, this invention pertains to the reconstitution of an active oxidation catalyst from a deactivated oxidation catalyst comprising a titanosilicate having deposited thereon one or more catalytic metals and, optionally, one or more promoter metals.

Titanosilicates find utility in catalysts for oxidation processes. As an example, the art recognizes the production of olefin oxides by the hydro-oxidation of an olefin with oxygen in the presence of hydrogen and in the presence of a catalyst comprising a titanosilicate having deposited thereon one or more catalytic metals. Likewise, the art recognizes the production of alcohols and ketones by the hydro-oxidation of an alkane with oxygen in the presence of hydrogen and in the presence of a similar catalyst comprising a titanosilicate having deposited thereon one or more catalytic metals. Catalytic metals for such oxidation catalysts include gold, silver, the platinum group metals, the rare earth lanthanides, and mixtures thereof. As an alternative example, the art recognizes the production of olefin oxides by the oxidation of an olefin with hydrogen peroxide in the presence of a catalyst comprising a titanosilicate and a platinum group metal, typically palladium. The aforementioned oxidation catalysts may also have deposited thereon one or more catalytic promoter metals, such as the elemental metals or ions of the alkali, alkaline earth, and lanthanide rare earth elements, and mixtures thereof.

Like most catalysts, the above-identified oxidation catalysts operate until totally spent or until the degree of deactivation renders the operation no longer economical. When that level of deactivation is reached, replacement or regeneration of the catalyst is necessary. Regeneration of a deactivated oxidation catalyst is typically effected by calcination under oxygen or air, as disclosed, for example, in WO 98/00414 and WO 99/00188. Disadvantageously, the calcination may not restore sufficient catalytic activity. Moreover, at some point the deactivated catalyst may not be capable of regeneration, at which time the catalyst must be replaced with fresh catalyst. Accordingly, a need exists in the art for an improved and economical method of regenerating or reconstituting a deactivated oxidation catalyst comprising a titanosilicate having deposited thereon one or more catalytic metals, and optionally, one or more promoter metals.

The art, as exemplified in WO 99/39827, discloses regeneration of a spent catalyst containing gold deposited on a titanium dioxide support, by contacting the spent catalyst with dilute acid, such as sulfuric acid, followed by drying and calcining the acid-treated catalyst. The disclosed method does not teach removing catalytic metals from the support, and the titanium dioxide is not reclaimed. The reference is also silent with respect to the stability of titanosilicates in the presence of acid.

Other art, exemplified by US-A1-2003/0228970, discloses regeneration of a spent titanosilicate catalyst, absent catalytic or promoter metals, by contacting the spent titanosilicate with an acid, such as nitric, hydrochloric, or sulfuric acid, at a pH less than or equal to 3, followed by washing, drying, and calcining the acid-treated catalyst. The reference is silent with regard to catalytic metals being deposited on or being removed from the titanosilicate.

The prior art methods of regenerating oxidation catalysts do not address the aforementioned problems of regenerating a catalyst comprising a titanosilicate having deposited thereon one or more catalytic metals and, optionally, one or more promoter metals. The inability of prior art methods to regenerate deactivated oxidation catalysts to a sufficient level of catalytic activity inhibits the use of such catalysts on a commercial scale. Accordingly, a need exists to find an improved method of reconstituting a spent or deactivated oxidation catalyst comprising a titanosilicate having deposited thereon one or more catalytic metals and, optionally, one or more promoter metals.

SUMMARY OF THE INVENTION

In one aspect, this invention provides for a method of reclaiming a titanosilicate from a deactivated oxidation catalyst comprising a titanosilicate having deposited thereon one or more catalytic metals and, optionally, one or more promoter metals. The reclamation method of this invention comprises:

(a) treating the deactivated oxidation catalyst comprising a titanosilicate having deposited thereon one or more catalytic metals and, optionally, one or more promoter metals, with an oxidant;

(b) contacting the oxidant-treated oxidation catalyst with acid under conditions sufficient to obtain a titanosilicate substantially free of the one or more catalytic metals and, optionally, the one or more promoter metals; and (c) washing the titanosilicate from step (b) under conditions sufficient to remove residual acid and reclaim the titanosilicate.

The method of this invention provides for reclamation of a titanosilicate from a deactivated oxidation catalyst comprising a titanosilicate having deposited thereon one or more catalytic metals and, optionally, one or more promoter metals. Beneficially, the method of this invention reclaims the titanosilicate in an essentially fresh form, that is, in a form essentially indistinguishable from a fresh titanosilicate. The term "fresh" refers to the titanosilicate as it is recovered from its synthesis solution and prior to use in any catalytic process. More specifically, the reclaimed titanosilicate possesses a silicon to titanium atomic ratio (Si/Ti) and a structural lattice, for example, a crystallographic structure, that are essentially identical to those of the fresh titanosilicate. In its reclaimed form the titanosilicate is essentially free of catalytic metals and promoter metals that are not part of the structural lattice. Such catalytic and promoter metals are those that had been previously deposited onto the titanosilicate in a deposition step. Advantageously, the reclaimed titanosilicate is ready for recycle into reconstituted catalyst.

In a second aspect, this invention provides for a method of reconstituting an active oxidation catalyst from a deactivated oxidation catalyst comprising a titanosilicate having deposited thereon one or more catalytic metals and, optionally, one or more promoter metals. In this second aspect, the invention comprises:

(a) treating the deactivated oxidation catalyst comprising a titanosilicate having deposited thereon one or more catalytic metals and, optionally, one or more promoter metals with an oxidant;

(b) contacting the oxidant-treated oxidation catalyst with acid under conditions sufficient to obtain a titanosilicate substantially free of the one or more catalytic metals and, optionally, the one or more promoter metals;

(c) washing the titanosilicate from step (b) under conditions sufficient to remove residual acid and reclaim the titanosilicate;

(d) optionally, drying the reclaimed titanosilicate;

(e) optionally, calcining the reclaimed titanosilicate obtained from step (c) or step (d); and (f) depositing one or more catalytic metals and, optionally, one or more promoter metals onto the reclaimed titanosilicate under conditions sufficient to reconstitute the active oxidation catalyst.

The method of this invention provides for reconstitution of an active oxidation catalyst from a deactivated oxidation catalyst comprising a titanosilicate have deposited thereon one or more catalytic metals and, optionally, one or more promoter metals. Beneficially, the method of this invention provides for essentially full recovery of the productivity of the catalyst as exhibited in its original fresh form, while maintaining acceptable product selectivities. More beneficially, the method of this invention reconstitutes the active sites of the catalytic metal(s) and optional promoter metal(s), while removing or decreasing sintered and catalytically inactive metal clusters.

DETAILED DESCRIPTION OF THE INVENTION

As described hereinbefore, this invention provides for reclamation of a titanosilicate from a deactivated oxidation catalyst comprising a titanosilicate having deposited thereon one or more catalytic metals and, optionally, one or more promoter metals; and further provides for the reconstitution of an active oxidation catalyst from the deactivated oxidation catalyst. In the first aspect pertaining to reclamation, the method comprises:

(a) treating the deactivated oxidation catalyst comprising the titanosilicate having deposited thereon one or more catalytic metals and, optionally, one or more promoter metals with an oxidant;

(b) contacting the oxidant-treated oxidation catalyst with acid under conditions sufficient to obtain a titanosilicate substantially free of the one or more catalytic metals and, optionally, the one or more promoter metals; and (c) washing the titanosilicate from step (b) under conditions sufficient to remove residual acid and reclaim the titanosilicate.

The above-identified method reclaims the titanosilicate in an essentially fresh form, that is, a form comparable to fresh, as-synthesized titanosilicate.

In a preferred embodiment, this invention provides for reclamation of a titanosilicate from a deactivated oxidation catalyst wherein the catalytic metal or metals are selected from gold, silver, the lanthanide rare earths, the platinum group metals, and mixtures thereof. In a more preferred embodiment, the catalytic metal is selected from gold, silver, palladium, and mixtures thereof. In another preferred embodiment of the invention, the acid comprises aqua regia.

In yet another preferred aspect, after step (c) of the reclamation process, optionally, the washed titanosilicate may be dried and calcined.

In a second aspect, this invention provides for a method of reconstituting an active oxidation catalyst from a deactivated oxidation catalyst comprising a titanosilicate having deposited thereon one or more catalytic metals and, optionally, one or more promoter metals. In this second aspect, this invention comprises:

(a) treating a deactivated oxidation catalyst comprising the titanosilicate having deposited thereon one or more catalytic metals and, optionally, one or more promoter metals with an oxidant;

(b) contacting the oxidant-treated oxidation catalyst with acid under conditions sufficient to obtain a titanosilicate substantially free of the one or more catalytic metals and, optionally. the one or more promoter metals;

(c) washing the acid-treated titanosilicate from step (b) under conditions sufficient to remove residual acid and reclaim the titanosilicate;

(d) optionally, drying the reclaimed titanosilicate;

(e) optionally, calcining the reclaimed titanosilicate obtained from step (c) or step (d); and (f) depositing one or more catalytic metals and, optionally, one or more promoter metals onto the reclaimed titanosilicate under conditions sufficient to reconstitute the active oxidation catalyst.

In a preferred embodiment of this second aspect, the invention provides for a method of reconstituting an active hydrooxidation catalyst comprising a titanosilicate having deposited thereon one or more catalytic metals and, optionally, one or more promoter metals, wherein the one or more catalytic metals are selected from gold, silver, the platinum group metals, the rare earth lanthanides, and mixtures thereof. In a more preferred embodiment of this second aspect, the catalytic metal is selected from gold, silver, palladium, and mixtures thereof.

In another preferred embodiment of the above second aspect, the acid comprises aqua regia.

In yet another preferred aspect of both inventions, the oxidation catalyst further comprises one or more promoter metals selected from Group 1, Group 2, the lanthanide rare earths, the actinides, and mixtures thereof, of the Periodic Table of Elements.

Any titanosilicate that is operably employed in an oxidation catalyst can be adapted to the reclamation and reconstitution processes of this invention. Suitable titanosilicates exhibit a characteristic lattice structure formed from $SiO_4^{4-}$ tetrahedra and nominally $TiO_4^{4-}$ tetrahedra. The titanosilicate can be a crystalline framework having a periodic regularity identifiable by X-ray diffraction (XRD) analysis. Alternatively, the titanosilicate can be amorphous having a random or non-periodic lattice structure with no well-defined XRD diffraction pattern. Preferably, the titanosilicate is porous, which means that within the titanosilicate structural lattice there exists a regular or irregular system of pores or channels. Empty cavities, referred to as "cages," can also be present. The pores can be isolated or interconnecting, and they can be one, two, or three dimensional. Preferably, the pores are micropores or mesopores or some combination thereof. For the purposes of this invention, a micropore shall be taken to have a pore diameter (or critical dimension as in the case of a non-circular perpendicular cross-section) ranging from about 4 Å to about 20 Å, while a mesopore shall have a pore diameter or critical dimension ranging from greater than about 20 Å to about 200 Å. More preferably, the combined volume of micropores and mesopores comprises about 70 percent or greater of the total pore volume, and most preferably, about 80 percent or greater of the total pore volume. The balance of the pore volume comprises macropores having a pore diameter of greater than about 200 Å.

Non-limiting examples of porous titanosilicates that are suitably employed in the process of this invention include porous amorphous titanosilicates; porous layered titanosilicates; crystalline microporous titanosilicates, such as titanium silicalite-1 (TS-1), titanium silicalite-2 (TS-2), titanosilicate beta (Ti-beta), titanosilicate ZSM-12 (Ti-ZSM-12) and titanosilicate ZSM-48 (Ti-ZSM-48); and mesoporous titanosilicates, such as Ti-MCM-41; as well as porous titanosilicates containing a plurality of titanium coordination sites or species. The structural properties and the preparation of various titanosilicates are reported in the art, including, for example, the following references, incorporated herein by reference:

TS-1: A. Tuel, *Zeolites,* 1996, 16, 108-117; by S. Gontier and A. Tuel, *Zeolites,* 1996, 16, 184-195; by A. Tuel and Y. Ben Taarit in *Zeolites,* 1993, 13, 357-364; by A. Tuel, Y. Ben Taarit and C. Naccache in *Zeolites,* 1993, 13, 454-461; by A. Tuel and Y. Ben Taarit in *Zeolites,* 1994, 14, 272-281; and by A. Tuel and Y. Ben Taarit in *Microporous Materials,* 1993, 1, 179-189.

TS-2: J. Sudhakar Reddy and R. Kumar, *Zeolites,* 1992, 12, 95-100; by J. Sudhakar Reddy and R. Kumar, *Journal of Catalysis,* 1991, 130, 440-446; and by A. Tuel and Y. Ben Taarit, *Applied Catal. A, General,* 1993, 102, 69-77.

Ti-beta: PCT patent publication WO 94/02245 (1994); M. A. Camblor, A. Corma, and J. H. Perez-Pariente, *Zeolites,* 1993, 13, 82-87; and M. S. Rigutto, R. de Ruiter, J. P. M. Niederer, and H. van Bekkum, *Stud. Surf. Sci. Cat.,* 1994, 84, 2245-2251.

Ti-ZSM-12: S. Gontier and A. Tuel, *Zeolites,* 1996, 16, 184-195.

Ti-ZSM-48: R. Szostak, *Handbook of Molecular Sieves,* Chapman & Hall, New York, 1992, p. 551-553. Other references to the preparation and properties of Ti-ZSM-48 include C. B. Dartt, C. B. Khouw, H. X. Li, and M. E. Davis, *Microporous Materials,* 1994, 2, 425-437; and A. Tuel and Y. Ben Taarit, *Zeolites,* 1996, 15, 164-170.

Ti-MCM-41: S. Gontier and A. Tuel, *Zeolites,* 1996, 15, 601-610; and M. D. Alba, Z. Luan, and J. Klinowski, *J. Phys. Chem.,* 1996, 100, 2178-2182.

With regard to titanosilicates having a plurality of titanium coordination sites or species, refer to U.S. Pat. No. 6,255,499, incorporated herein by reference.

The silicon to titanium atomic ratio (Si/Ti) of the titanosilicate can be any ratio that provides for an active and selective oxidation catalyst. A generally advantageous Si/Ti atomic ratio is equal to or greater than about 5/1; preferably, greater than about 10/1, more preferably, greater than about 35/1; and most preferably, greater than about 50/1. A generally advantageous Si/Ti atomic ratio is equal to or less than about 20,000/1; preferably, less than about 10,000/1; more preferably, less than about 1,000/1; and most preferably, less than about 300/1. The Si/Ti atomic ratio defined hereinabove refers to a bulk ratio that includes the total of the framework titanium and any extra-framework titanium.

In one embodiment, the titanosilicate is substantially free of titanium dioxide, and preferably, substantially free of the crystalline anatase phase of titanium dioxide. Crystalline titanium dioxide may be present, for example, as extra-framework titania or titania added as a carrier or support. Raman spectroscopy can be used to determine the presence of crystalline titanium dioxide. The anatase phase of titanium dioxide exhibits a characteristic strong, sharp Raman peak at about 147 $cm^{-1}$. The rutile phase of titanium dioxide exhibits Raman peaks at about 448 $cm^{-1}$ and about 612 $cm^{-1}$. The brookite phase, which usually is available only as a natural mineral, exhibits a characteristic peak at about 155 $cm^{-1}$. The rutile and brookite peaks have a lower intensity than the 147 $cm^{-1}$ peak of anatase. In this preferred embodiment, Raman peaks for the anatase, rutile, and brookite phases of titanium dioxide are essentially undetectable. When the catalyst exhibits essentially no detectable peaks at the aforementioned wavenumbers, then it is estimated that less than about 0.02 weight percent of the catalyst exists in the form of crystalline titanium dioxide. Raman spectra can be obtained on any suitable laser Raman spectrometer equipped, for example, with an argon ion laser tuned to the 514.5 nm line and having a laser power of about 90 to 100 mW measured at the sample.

In another preferred embodiment, the titanosilicate possesses a plurality of titanium coordination environments, resulting in a plurality of titanium species, as disclosed in U.S. Pat. No. 6,255,499, incorporated herein by reference. The coordination environment refers to the number and geometry of the bonds to titanium. As applied to titanosilicates, the coordination environments can include framework and non-framework titanium. Framework titanium refers to titanium incorporated into the titanosilicate crystallographic structure. Extra-framework titanium refers to titanium that, although attached to the framework typically through a Ti—O bond, is not incorporated into the titanosilicate crystallographic framework. Geometries, such as tetrahedral, trigonal bipyramidal, square pyramidal, octahedral, and distorted variations thereof are all acceptable coordination environments. The plurality of coordination types may also be satisfied by having two or more variations of the same coordination, for example, two different types of tetrahedral coordination. A preferred titanosilicate having a plurality of titanium coordination environments comprises a quasi-crystalline material of MFI crystallographic structure, as determined by XRD, the plurality of titanium species being determined, for example, by X-ray photoelectron spectroscopy (XPS) and/or ultraviolet-visible diffuse reflectance spectroscopy (UV-VIS DRS). In this preferred embodiment, at least one titanium species is believed to be a framework titanium, and at least one different titanium species is believed to be a titanium grafted onto the framework, although this theory should not limit the invention in any manner. The preparation and identification of the aforementioned titanosilicate having a plurality of titanium coordination sites can be found in U.S. Pat. No. 6,255,499, referenced hereinbefore.

The titanosilicate employed in this invention may further comprise one or more elements bound within the structural lattice. Non-limiting examples of such elements include, for example, aluminum, boron, chromium, gallium, germanium, niobium, tungsten, vanadium, zirconium, and mixtures thereof. If one or more of these elements are present, then generally, the total concentration of these elements is greater than about 0 percent and less than about 10 percent by weight.

Any catalytic metal that in combination with the titanosilicate provides for a catalyst capable of oxidizing an organic compound may be employed in the process of this invention. Non-limiting examples of suitable catalytic metals include gold, silver, the lanthanide rare earths, the platinum group metals, and mixtures thereof. The lanthanide rare earths are meant to include lanthanum, cerium, praseodymium, neodymium, promethium, samarium, europium, gadolinium, terbium, dysprosium, holmium, erbium, thulium, ytterbium, and lutetium. The platinum group metals are meant to include ruthenium, rhodium, palladium, osmium, iridium, and platinum. Preferably, the catalytic metal comprises gold, silver, palladium, or a combination thereof. More preferably, the catalytic metal comprises gold or gold combined with silver, a lanthanide rare earth, a platinum group metal, or a mixture thereof.

The total loading of catalytic metal(s) on the titanosilicate can be any quantity that produces an operable oxidation catalyst. Typically, the total loading of catalytic metal(s) on the titanosilicate is greater than about 0.001, preferably, greater than about 0.01, and more preferably, greater than about 0.1 weight percent, based on the weight of the catalytic metal(s) and titanosilicate. Generally, the total loading of catalytic metal(s) is less than about 20, preferably, less than about 10, even more preferably, less than about 5, and most preferably, less than about 1 weight percent, based on the weight of the catalytic metal(s) and titanosilicate.

Optionally, the catalyst may further comprise one or more promoter metals. Any metal ion having a valence between +1 and +7 that enhances the productivity of the catalyst in the desired oxidation process can be employed as the promoter. Factors contributing to increased productivity of the catalyst include increased conversion of the organic compound to be oxidized, increased selectivity to the desired oxidation product, decreased production of byproducts, such as water, and increased catalyst lifetime. Non-limiting examples of suitable promoters include the metals of Groups 1 through 12 of the Periodic Table of the Elements, as well as the rare earth lanthanides and actinides, as referenced in the *CRC Handbook of Chemistry and Physics*, 75$^{th}$ ed., CRC Press, 1994. Preferably, the promoter is selected from Group 1 metals of the Periodic Table including lithium, sodium, potassium, rubidium, and cesium; from Group 2 metals including beryllium, magnesium, calcium, strontium, and barium; from the lanthanide rare earth metals including lanthanum, cerium, praseodymium, neodymium, promethium, samarium, europium, gadolinium, terbium, dysprosium, holmium, erbium, thulium, ytterbium, and lutetium; and the actinide metals, specifically, thorium and uranium; and mixtures of the aforementioned metals. More preferably, the promoter is selected from lithium, sodium, potassium, rubidium, cesium, magnesium, calcium, barium, erbium, lutetium, and mixtures thereof. The lanthanides may be considered to function as the catalytic metal when gold, silver, and a platinum group metal are absent (e.g., La/Na only). The lanthanides may be considered to function as promoter metals when gold, silver, and/or a platinum group metal is present (e.g., Au//La/Na).

The total quantity of promoter metals deposited on the titanosilicate typically is greater than about 0.001, preferably, greater than about 0.01, and more preferably, greater than about 0.10 weight percent, based on the total weight of the catalyst. The total quantity of promoter metals deposited on the titanosilicate is typically less than about 20, preferably, less than about 15, and more preferably, less than about 10 weight percent, based on the total weight of the catalyst.

In addition to catalytic metal(s) and promoter metals, the oxidation catalyst may also contain one or more promoting anions including, for example, halide, carbonate, phosphate, and carboxylic acid anions, e.g., acetate, maleate, and lactate. Such promoting anions are known in the art, as described in WO 00/59632, incorporated herein by reference.

In the preparation of the fresh oxidation catalyst, the catalytic metal(s) and optional promoter metal(s) can be deposited onto the titanosilicate by any method known in the art. Non-limiting examples of known deposition methods include impregnation, ion-exchange, deposition-precipitation, spray-drying, vapor deposition, and solid-solid reaction. A deposition-precipitation method is disclosed by S. Tsubota, M. Haruta, T. Kobayashi, A. Ueda, and Y. Nakahara, "Preparation of Highly Dispersed Gold on Titanium and Magnesium Oxide," in *Preparation of Catalysts V*, G. Poncelet, P. A. Jacobs, P. Grange, and B. Delmon, eds., Elsevier Science Publishers B.V., Amsterdam, 1991, p. 695ff, incorporated herein by reference. A preferred impregnation method is disclosed in WO 00/59633, incorporated herein by reference.

The catalyst employed in this invention can be bound to or extruded with a subsidiary support or binder. Typically, the subsidiary support or binder is employed to improve the attrition resistance or the strength of the catalyst. Suitable subsidiary supports include aluminas, silicas, clays, silica-aluminas, aluminosilicates, titanias, zirconia, magnesia, and other like refractory oxides. When a subsidiary support is employed, it may be used in a concentration ranging from greater than about 1 percent, preferably, greater than about 5 percent, to less than about 90 percent, and preferably, less than about 70 percent, by weight, based on the total weight of the catalyst and subsidiary support. This invention is not limited in any manner to the shape of the bound or supported catalyst. Any variety of shapes is suitable. It may be desirable, as noted hereinbelow, to crush the supported or bound catalyst into smaller particles prior to implementing the reclamation and reconstitution processes of this invention. In one preferred embodiment, the larger particles or chunks of bound or supported catalyst are crush-sieved through a size 14-30 U.S. mesh (1,536-595 microns).

The fresh catalyst, thus prepared, comprising a titanosilicate having deposited thereon one or more catalytic metals, optionally, one or more promoter metals, and optionally one or more promoting anions, finds utility in the oxidation of organic compounds. For a preferred oxidation process, reference is made to U.S. Pat. No. 6,031,116, U.S. Pat. No. 5,965,754, WO 98/00414, U.S. Pat. No. 6,323,351, U.S. Pat. No. 6,255,499, wherein olefins are oxidized with oxygen in the presence of hydrogen to form olefin oxides. For another preferred oxidation process, refer to EP-A2-0230949, EP-A1-0712852, and IT-B-1290847, wherein olefins are oxidized with hydrogen peroxide to form olefin oxides. With continued use in oxidation processes, the activity of the oxidation catalyst steadily decreases, until the catalyst is partially or fully deactivated (spent). At such a point, the processes of this invention can be implemented to reclaim the titanosilicate and reconstitute the oxidation catalyst to essentially full productivity.

The processes of this invention to reclaim and reconstitute the titanosilicate catalyst may be conducted on spent or deactivated catalyst in any physical form, such as powders, chunks, particles, pellets, and beads. It may be desirable to crush larger-sized particles of catalyst, either in unsupported or supported form, into particles of a smaller size to facilitate the reclamation method of this invention. Crushing can be accomplished by any conventional method. Sieving may be employed to maintain a desired particle size. Preferably, a size 14-30 U.S. mesh (1,536-595 microns) allows for a satisfactory reclamation process.

In the first step to reclaim the titanosilicate and reconstitute the oxidation catalyst, the deactivated catalyst is treated with an oxidant, which may be any compound with oxidizing capabilities. Non-limiting examples of suitable oxidants include gas phase oxidants, such as oxygen, ozone, and nitrogen oxides, and liquid phase oxidants, such as aqueous hydrogen peroxide. Preferably, the oxidant is a gas phase oxidant, more preferably, essentially pure oxygen or oxygen mixed with an inert gas, such as nitrogen, argon, or helium. Under gas phase conditions, the treatment with oxidant comprises contacting the deactivated catalyst with the gas phase oxidant at a temperature typically greater than about 250° C., and preferably, greater than about 350° C. Typically, the contacting temperature is less than about 850° C., preferably, less than about 700° C. The treatment contacting time is typically greater than about 1 minute and less than about 16 hours. Such gas phase oxidant treatment can be accomplished directly in the oxidation process reactor after the catalyst has deactivated. Alternatively, the treatment can be accomplished in a separate reactor into which the deactivated catalyst has been transported. Under liquid phase conditions, the oxidant treatment comprises contacting the deactivated catalyst with a liquid phase oxidant or a solution containing the oxidant. Preferably, the liquid phase treatment comprises washing the deactivated catalyst with an aqueous solution of hydrogen peroxide, more preferably, an aqueous solution comprising from about 5 to about 70 weight percent hydrogen peroxide. The temperature for the liquid phase treatment is limited by the boiling and/or decomposition point of the liquid phase components. Typically, the liquid phase treatment is conducted at a temperature ranging from about ambient temperature, taken as about 20° C., to less than about 120° C.

The oxidant-treated catalyst is thereafter contacted with acid under conditions sufficient to obtain a titanosilicate substantially free of catalytic metal(s) and optional promoter metal(s). The acid treatment typically involves agitating the oxidant-treated catalyst in a solution of inorganic acid. Any inorganic acid may be employed for this purpose, provided that the acid is capable of solubilizing the catalytic and optional promoter metals, without substantially leaching titanium or other lattice metals from the titanosilicate and without damaging the titanosilicate lattice (or crystallographic structure). Non-limiting examples of suitable inorganic acids include hydrochloric, nitric, sulfuric, and phosphoric acids, as well as combinations thereof, including aqua regia. Preferably, the acid is aqua regia. The pH and concentration of the acid solution may vary widely and are not critical. Typically, the pH of the acid solution is less than about +5, preferably, less than about +3. Typically, the concentration of acid in the acid solution ranges from about 50 to about 100 percent by volume (e.g., for aqua regia, this is approximately 4.5 to 45% by weight). Generally, the volume of acid solution used per gram deactivated catalyst is greater than about 1 ml/g, and preferably, greater than about 5 ml/g. The volume of acid solution used per gram deactivated catalyst is typically less than about 100 ml/g, and preferably, less than about 50 ml/g, and more preferably, less than about 20 ml/g. The acid solution is typically provided as an aqueous solution or as an aqueous solution containing a water-soluble organic solvent, preferably, a polar solvent. More preferably, the polar organic solvent is an alcohol, most preferably, methanol. The temperature and time of the acid treatment may also vary. Generally, the temperature is greater than about 10° C., preferably, greater than about 20° C. Generally, the temperature is less than about 100° C., preferably, less than about 50° C. The acid treatment is typically conducted at ambient pressure. Generally, the contact time is greater than about 1 minute, preferably, greater than about 20 minutes. Generally, the contact time between the oxidant treated deactivated catalyst and acid solution is less than about 24 hours, preferably, less than about 10 hours, and more preferably less than about 3 hours. The acid treatment is generally facilitated by agitating the mixture containing the aqueous solution and the oxidant-treated catalyst, such agitation being effected in any conventional manner including stirring, shaking, rolling, with or without stirring means, such as impeller blades and stirring bars; or the agitation being effected by less conventional means, such as, ultrasonic agitation. Optionally, acid treatment can be done for shorter periods of time by removing spent acid and repeating acid treatment with fresh acid.

After completion of the acid treatment, a titanosilicate is obtained that is substantially free of catalytic metals and, optionally, promoter metals. By "substantially free" is meant that the titanosilicate contains less than about 5 weight percent of the original concentration of such metal, preferably, less than about 1 weight percent of the original concentration of such metal. Any metals forming an integral part of the lattice structure of the titanosilicate, such as titanium, are essentially unaffected by the acid treatment. The titanosilicate resulting from the acid treatment is separated from the acid solution by any conventional separation means, such as, filtration, decantation, centrifugation, or a combination thereof. If desired, the recovered acid solution may be worked-up by conventional methods, including neutralization, precipitation, evaporation, electrolytic deposition, or any other suitable method, to recover the catalytic metal(s) and optional promoter metal(s).

Thereafter, the recovered titanosilicate is washed with a solvent capable of removing residual acid from the titanosilicate. Water or any organic solvent will suffice, but preferably, the washing solvent is water. Per wash, the washing solvent is used in a quantity greater than about 1 milliliter (ml), and preferably, greater than about 5 ml per gram titanosilicate. Per wash, the washing solvent is used in a quantity less than about 1,000 ml, and preferably, less than about 500 ml per gram titanosilicate. Again, washing is preferably conducted with agitation, such agitation to include stirring, shaking, rolling, and ultrasonic agitation, as noted hereinbefore. The washing is typically repeated until analysis of the recovered wash liquid is substantially acid free. Preferably, washing is repeated until the wash liquid indicates a pH greater than about +5. Typically, from greater than about 2 to less than about 10 washes are employed, preferably, from greater than about 3 to less than about 6 washes are employed. Washing is typically conducted at a temperature greater than about 10° C., preferably, greater than about 20° C. Washing is typically conducted at a temperature less than about 100° C., and preferably, less than about 50° C. The titanosilicate recovered after washing comprises the reclaimed titanosilicate.

Optionally, the reclaimed titanosilicate may be dried and/or calcined prior to use. The drying may be effectively accomplished at any temperature and time suitable for removing wash solvent without unacceptable damage to the titanosilicate lattice or crystallographic structure. For the preferred wash solvent, which is water, the drying may be conducted at a temperature typically greater than about 20° C., and preferably, greater than about 70° C.; but typically less than about 150° C., and preferably, less than about 100° C. If a solvent other than water is used, then the drying temperature may be adjusted appropriately by one skilled in the art. Optionally, the drying may be conducted under a vacuum to accelerate the drying process.

The optional calcination may be accomplished at any temperature and for any time suitable for removing residual solvent, such as water, and/or residual organics, provided that no unacceptable damage to the titanosilicate lattice structure occurs. The calcination may be employed under an inert gas, optionally, containing air or oxygen. If calcination is employed, then the catalyst is preferably calcined in an atmosphere of nitrogen containing from about 0 to about 30 percent oxygen, and preferably, from about 10 to about 25 percent oxygen, by volume. The calcination temperature beneficially is greater than about 150° C., preferably, greater than about 300° C., and more preferably greater than about 450° C. The calcination temperature beneficially is less than about 900° C., preferably, less than about 750° C., and more preferably, less than about 600° C. The heating rate from room temperature to the calcination temperature is typically greater than about 0.1° C./min, and preferably, greater than about 0.5° C./min, and more preferably, greater than about 1.5° C./min. The heating rate from room temperature to the calcination temperature is typically less than about 20° C./min, preferably, less than about 15° C./min, and more preferably, less than about 10° C./min. At the calcination temperature, the hold time is typically greater than about 0.5 hours, preferably greater than about 5 hours, and more preferably greater than about 8 hours. The hold time at the calcination temperature is typically less than about 24 hours, preferably, less than about 15 hours, and more preferably, less than about 12 hours.

On analysis, the reclaimed titanosilicate appears essentially identical to fresh, as-synthesized titanosilicate. Specifically, the reclaimed titanosilicate exhibits a lattice structure essentially identical to that of the as-synthesized titanosilicate. In the case of a crystalline titanosilicate, the X-ray diffraction pattern (XRD) of the reclaimed titanosilicate appears essentially identical to that of the as-synthesized titanosilicate. Moreover, the Si/Ti atomic ratio of the reclaimed titanosilicate is essentially identical to that of as-synthesized material. These two features, the lattice structure and the Si/Ti atomic ratio, indicate that the acid treatment does not substantially leach titanium from the titanosilicate or substantially disrupt its lattice. Further, the reclaimed titanosilicate, like the fresh as-synthesized titanosilicate, is substantially free of the catalytic metal(s) and promoter metal(s). In this context, the term "substantially free" means that the titanosilicate contains less than about 5 weight percent of the original concentration of such catalytic and promoter metal(s), preferably, less than about 1 weight percent of the original concentration of such metal(s). For clarity, it is mentioned that the metals incorporated into the titanosilicate lattice structure, namely, titanium and any other lattice metal, remain essentially undisturbed by the reclamation process. Generally, the amount of titanium in the reclaimed titanosilicate is essentially identical to that found in the fresh titanosilicate.

Once the titanosilicate is reclaimed as noted hereinabove, the final step in reconstituting an active oxidation catalyst involves re-deposition of catalytic metal(s) and optional promoter metal(s) onto the reclaimed titanosilicate. The catalytic metal(s) preferably comprise any of those mentioned hereinbefore including gold, silver, the lanthanide rare earths, the platinum group metals, and any combination thereof. Likewise, the promoter metal(s) are those identified hereinbefore, preferably, the alkali and alkaline earths, the lanthanide rare earths, the actinides, and combinations thereof.

Techniques for depositing catalytic metal(s) and, optionally, promoter metals(s) onto the reclaimed titanosilicate have been cited hereinbefore and are also documented in the art. Preferably, the catalytic metals and optional promoter(s) are impregnated onto the reclaimed titanosilicate from one or more aqueous or organic solutions containing a soluble metal salt of each desired catalytic metal(s) and/or optional promoter(s). Catalytic or promoter metal salts with adequate solubility in the selected solvent can be employed, including, for example, the nitrates, halides, carbonates, borates, and carboxylates, for example, acetates, oxylates, lactates, citrates, maleates, cinnamates, and mixtures thereof. Water is the preferred impregnation solvent, but organic solvents, such as alcohols, esters, ketones, and aliphatic and aromatic hydrocarbons, are also suitable. Typically, the molarity of the soluble salt in the impregnation solution ranges from about 0.001 M to the saturation point, preferably, from about 0.005 M to about 0.5 M. One or more impregnations of catalytic and optional promoter metal(s) may be conducted simultaneously or in any sequence, provided that the desired oxidation catalyst is obtained.

Generally, the reconstituted catalyst comprising one or more catalytic metals, optional promoter metal(s), and/or promoting anions deposited on the reclaimed titanosilicate is typically subjected to drying under vacuum or under air prior to use. The drying temperature lies between about 20° C. and about 120° C. Optionally after drying, a higher temperature heating may be employed under air, or oxygen, or under a reducing atmosphere, such as hydrogen, or under an inert atmosphere, such as nitrogen. If a higher temperature heating is employed, then the catalyst is preferably calcined in an atmosphere of nitrogen containing from about 0 to about 30 percent oxygen, and preferably, from about 10 to about 25 percent oxygen, by volume. The calcination temperature beneficially is greater than about 450° C., preferably, greater than about 500° C., and more preferably greater than about 525° C. The calcination temperature beneficially is less than about 900° C., preferably, less than about 750° C., and more preferably, less than about 600° C. The heating rate from room temperature to the calcination temperature is typically greater than about 0.1° C./min, and preferably, greater than about 0.5° C./min, and more preferably, greater than about 1.5° C./min. The heating rate from room temperature to the calcination temperature is typically less than about 20° C./min, preferably, less than about 15° C./min, and more preferably, less than about 10° C./min. At the calcination temperature, the hold time is typically greater than about 2 hours, preferably greater than about 5 hours, and more preferably greater than about 8 hours. The hold time at the calcination temperature is typically less than about 24 hours, preferably, less than about 15 hours, and more preferably, less than about 12 hours.

The reconstituted oxidation catalyst obtained from the above-identified process can be employed in any known oxidation process. A preferred process involves the hydro-oxidation of a hydrocarbon in the presence of oxygen, hydrogen, and the reconstituted catalyst to form a partially-oxidized hydrocarbon, such as an alcohol, ketone, carboxylic acid, or olefin oxide. A more preferred hydro-oxidation process involves contacting an olefin with oxygen in the presence of hydrogen and the reconstituted catalyst to form an olefin oxide, as referenced in U.S. Pat. No. 6,031,116, U.S. Pat. No. 5,965,754, WO 98/00414, U.S. Pat. No. 6,323,351, U.S. Pat. No. 6,255,499.

The hydrocarbon can be any hydrocarbon capable of participating in such a hydro-oxidation process, preferably, an alkane or an olefin. Typical alkanes comprise from 1 to about 20 carbon atoms, and preferably from 1 to about 12 carbon atoms. Typical olefins comprise from 2 to about 20 carbon atoms, preferably, from 2 to about 12 carbon atoms. Among the olefins, monoolefins are preferred, but olefins containing two or more double bonds, such as dienes, can also be employed. The hydrocarbon can contain only carbon and hydrogen atoms, and for the purposes of this invention can also include hydrocarbons substituted with one or more inert substituents. The term "inert", as used herein, requires the substituent to be substantially non-reactive in the process of this invention. Suitable inert substituents include, but are not limited to halo, ether, ester, alcohol, and aromatic moieties. Preferably, the halo substituent is chloro. Preferably, the ether, ester, and alcohol moieties comprise from 1 to about 12 carbon atoms. Preferably, the aromatic moiety comprises from about 6 to about 12 carbon atoms. Non-limiting examples of olefins suitable for the process of this invention include ethylene, propylene, 1-butene, 2-butene, 2-methylpropene, 1-pentene, 2-pentene, 2-methyl-1-butene, 2-methyl-2-butene, 1-hexene, 2-hexene, 3-hexene, and analogously, the various isomers of methylpentene, ethylbutene, heptene, methylhexene, ethylpentene, propylbutene, the octenes, including preferably 1-octene, and other higher analogues of these; as well as butadiene, cyclopentadiene, dicyclopentadiene, styrene, α-methylstyrene, divinylbenzene, allyl chloride, allyl alcohol, allyl ether, allyl ethyl ether, allyl butyrate, allyl acetate, allyl benzene, allyl phenyl ether, ally propyl ether, and allyl anisole. Preferably, the olefin is an unsubstituted or substituted $C_{3-12}$ olefin, more preferably, an unsubstituted or substituted $C_{3-8}$ olefin, most preferably, propylene.

For the reactant feed, the art cites typical and preferred concentrations of hydrocarbon, oxygen, hydrogen, and optional diluent. Typically, the quantity of hydrocarbon is greater than about 1, more preferably, greater than about 10, and most preferably, greater than about 20 mole percent, based on the total moles of hydrocarbon, oxygen, hydrogen, and any optional diluent that may be used, as noted hereinafter. Typically, the quantity of hydrocarbon is less than about 99, more preferably, less than about 85, and most preferably, less than about 70 mole percent, based on the total moles of hydrocarbon, oxygen, hydrogen, and optional diluent. Preferably, the quantity of oxygen is greater than about 0.01, more preferably, greater than about 1, and most preferably greater than about 5 mole percent, based on the total moles of hydrocarbon, hydrogen, oxygen, and optional diluent. Preferably, the quantity of oxygen is less than about 30, more preferably, less than about 20, and most preferably less than about 15 mole percent, based on the total moles of hydrocarbon, hydrogen, oxygen, and optional diluent. Typically, the amount of hydrogen employed is greater than about 0.01, preferably, greater than about 0.1, and more preferably, greater than about 1 mole percent, based on the total moles of hydrocarbon, hydrogen, oxygen, and optional diluent. Suitable quantities of hydrogen are typically less than about 50, preferably, less than about 30, and more preferably, less than about 15 mole percent, based on the total moles of hydrocarbon, hydrogen, oxygen, and optional diluent.

In addition to the basic feed components of hydrocarbon, oxygen, and hydrogen, it may be desirable to employ a diluent, as noted in the feed compositions hereinabove. Since the process is typically exothermic, a diluent beneficially provides a means of removing and dissipating heat produced. In addition the diluent provides an expanded concentration regime over which the reactants are non-flammable. The diluent can be any gas or liquid that does not inhibit the process of this invention. If the process is conducted in a gas phase, then suitable gaseous diluents include, but are not limited to helium, nitrogen, argon, methane, propane, carbon dioxide, steam, and mixtures thereof. If the process is conducted in a liquid phase, then the diluent can be any oxidation stable and thermally stable liquid. Examples of suitable liquid diluents include aliphatic alcohols, preferably $C_{1-10}$ aliphatic alcohols, such as methanol and t-butanol; chlorinated aliphatic alcohols, preferably $C_{1-10}$ chlorinated alkanols, such as chloropropanol; chlorinated aromatics, preferably chlorinated benzenes, such as chlorobenzene and dichlorobenzene; as well as liquid polyethers, polyesters, and polyalcohols. If used, the amount of diluent is typically greater than about 0, preferably greater than about 0.1, and more preferably, greater than about 15 mole percent, based on the total moles of hydrocarbon, oxygen, hydrogen, and diluent. The amount of diluent is typically less than about 95, preferably, less than about 85, and more preferably, less than about 50 mole percent, based on the total moles of hydrocarbon, oxygen, hydrogen, and diluent.

Typically, the hydro-oxidation process is conducted at a temperature greater than ambient, taken as 20° C., preferably, greater than about 70° C., more preferably greater than about 100° C., and most preferably, greater than about 120° C. Usually, the process is conducted at a temperature preferably less than about 300° C., more preferably less than about 230° C., and most preferably, less than about 175° C. Typically, the pressure of the hydro-oxidation is greater than about atmospheric, preferably, greater than about 15 psig (205 kPa), and more preferably, greater than about 200 psig (1379 kPa). Typically, the pressure is less than about 600 psig (4137 kPa), preferably, less than about 400 psig (2758 kPa), and more preferably, less than about 325 psig (2241 kPa).

In flow reactors the residence time of the reactants and the molar ratio of reactants to catalyst will be determined by the space velocity. For a gas phase process the gas hourly space velocity (GHSV) of the hydrocarbon reactant can vary over a wide range, but typically is greater than about 10 ml hydrocarbon per ml catalyst per hour ($hr^{-1}$), preferably greater than about 250 $hr^{-1}$, and more preferably, greater than about 1,400 $hr^{-1}$. Typically, the GHSV of the hydrocarbon reactant is less than about 50,000 $hr^{-1}$, preferably, less than about 35,000 $hr^{-1}$, and more preferably, less than about 20,000 $hr^{-1}$. Likewise, for a liquid phase process the weight hourly space velocity (WHSV) of the hydrocarbon reactant is typically greater than about 0.01 g hydrocarbon per g catalyst per hour ($hr^{-1}$), preferably, greater than about 0.05 $hr^{-1}$, and more preferably, greater than about 0.1 $hr^{-1}$. Typically, the WHSV of the hydrocarbon reactant is less than about 100 $hr^{-1}$, preferably, less than about 50 $hr^{-1}$, and more preferably, less than about 20 $hr^{-1}$. The gas and weight hourly space velocities of the oxygen, hydrogen, and optional diluent can be determined from the space velocity of the hydrocarbon by taking into account the relative molar ratios desired.

When evaluated in the aforementioned hydro-oxidation process, a catalyst reconstituted in accordance with this invention exhibits a productivity and selectivities closely similar to fresh catalyst. Generally, the reconstituted catalyst achieves a selectivity to olefin oxide of greater than about 60 mole percent, preferably, greater than about 70 mole percent, more preferably, greater than about 80 mole percent, and most preferably, greater than about 90 mole percent. For the purposes of this invention, "selectivity" is defined as the mole percentage of converted organic compound, preferably olefin, which forms a specific partially-oxidized compound, preferably, olefin oxide. In the preferred oxidation process wherein olefin is oxidized to olefin oxide with the formation of by-product water, the reconstituted catalyst achieves a water to propylene oxide molar ratio typically less than about 10/1, preferably, less than about 5/1. Thus, in respect of such achievements, the reconstituted catalyst performs comparably to fresh catalyst.

The invention will be further clarified by a consideration of the following examples, which are intended to be purely exemplary of the use of the invention. Other embodiments of the invention will be apparent to those skilled in the art from a consideration of this specification or practice of the invention as disclosed herein. Unless otherwise noted, all percentages are given on a weight percent basis.

Reference Experiment 1 (Ref 1)

A fresh hydro-oxidation catalyst is prepared by impregnating a titanosilicate support to the point of incipient wetness with a methanol solution containing hydrogen tetrachloroaurate (III) trihydrate and sodium acetate at a concentration to deliver 1600 parts per million (ppm) Au and a 22:1 molar ratio of NaOAc:Au. The impregnation is conducted at approximately 0° C. under ambient pressure. The resulting catalyst is dried at room temperature under vacuum. The performance of the catalyst is evaluated in a hydro-oxidation process wherein propylene is oxidized with oxygen in the presence of hydrogen to form propylene oxide. The hydro-oxidation is conducted in a stainless steel tubular reactor [12" (305 cm) length×½" (1.3 cm) diameter] loaded with catalyst (2 g). The catalyst is conditioned for 2 hours at 160° C. under nitrogen flow in the reactor. The reactor temperature is lowered to 140° C. prior to initiation of the final gas composition comprising 40% propylene, 10% oxygen, 3% hydrogen, balance nitrogen, by volume. This mixture is fed continuously to the reactor at a total flow rate of 1800 standard cubic centimeters per minute (SCCM) and a reactor pressure of 300 psig (2,069 kPa). The temperature is ramped to a final reaction temperature of 150° C. Data are collected at 6 hours into the run with the result shown in Table 1, Ref 1. This example using fresh catalyst represents a base line against which all reconstituted catalysts are referenced. Productivity, propylene oxide selectivity, and water to propylene oxide molar ratio ($H_2O/PO$) are each assigned a relative value of 1.00. Relative values greater than 1.00 would indicate that the measured property is higher than the base line reference. This is particularly desirable for productivity and selectivity; however, this is undesirable for $H_2O/PO$.

TABLE I

| Sample | | Relative Productivity | Relative Selectivity | Relative $H_2O/PO$ |
|---|---|---|---|---|
| Ref 1 | Fresh Catalyst | 1.00 | 1.00 | 1.00 |
| Ref 2 | Spent Catalyst | 0.13 | 0.93 | 3.91 |
| Ref 3 | Calcined | 0.41 | 1.02 | 1.04 |
| Ref 4 | Conc. Aqua Regia | 0.19 | 1.02 | 0.72 |
| Ex 1 | Calcined & Conc. Aqua Regia | 1.11 | 1.01 | 1.23 |
| Ex 2 | Calcined & Conc Aqua Regia, (Ultrasonic) | 0.96 | 1.01 | 1.16 |
| Ex 3 | Calcined & 65% Aqua Regia, 45 min | 1.18 | 1.00 | 0.62 |
| Ex 4 | Calcined & 30% Aqua Regia, 60 min | 1.09 | 1.00 | 0.77 |

Reference Experiment 2 (Ref 2)

A catalyst comprised of gold and sodium on a titanosilicate support bound with silica is prepared in a manner analogous to that described in experiment Ref 1. The catalyst is prepared by impregnating to the point of incipient wetness a titanosilicate support with a methanol solution containing hydrogen tetrachloroaurate (III) trihydrate and sodium acetate at a concentration to deliver 1800 ppm Au and a 22:1 molar ratio of NaOAc:Au. The catalyst is run to the effective end of its useful life (spent catalyst). The performance of the spent catalyst is evaluated in the manner described in experiment Ref 1 and the results are shown in Table 1, Ref 2. The catalyst productivity decreases to only 13 percent of the productivity of fresh reference catalyst (Ref 1). As activity decreases, generally the water/propylene oxide molar ratio increases to unacceptable values. The propylene oxide selectivity also decreases but generally at a slower rate that remains within acceptable levels.

Reference Experiment 3 (Ref 3)

A blend (equal amounts) of three spent catalysts comprising gold on a titanosilicate support bound with silica is regenerated by calcination under oxygen at 550° C. for 10 hours. Afterwards, the calcined material is re-impregnated to the point of incipient wetness with a methanol solution containing hydrogen tetrachloroaurate (III) trihydrate and sodium acetate at a concentration to deliver 1600 ppm Au and a 22:1 molar ratio of NaOAc:Au in the manner described in experiment Ref 1 hereinabove. No acid treatment is employed. The regenerated catalyst is evaluated in the hydro-oxidation of propylene in the manner described in experiment Ref 1, with the results shown in Table 1, Ref 3. While the propylene oxide selectivity and water/propylene oxide molar ratio resume values comparable to fresh catalyst (Ref 1), only about 41 percent of the productivity of fresh reference catalyst is regenerated. Accordingly, calcination alone is not a sufficiently effective method of regeneration.

Reference Experiment 4 (Ref 4)

A spent catalyst comprising gold and sodium on titanosilicate support bound with silica, as described in experiment Ref 2, is regenerated by treatment with concentrated aqua regia (3 parts concentrated hydrochloric acid and 1 part concentrated nitric acid), by swirling the spent catalyst in aqua regia (10 ml acid solution per 1 gram catalyst) at ambient temperature for 50 minutes. Then, the acid solution is decanted from treated material, and the material is washed with agitation with water (20 ml water per 1 gram catalyst). The decantation and wash procedures are repeated, at least 4 times, until the pH of the wash rinse is greater than +5. No calcination is conducted prior to acid treatment. The acid-treated material is dried at 80° C. and re-impregnated to the point of incipient wetness with a methanol solution containing hydrogen tetrachloroaurate (III) trihydrate and sodium acetate at a concentration to deliver 1600 ppm Au and a 22:1 molar ratio of NaOAc:Au in the manner described in experiment Ref 1. The resulting reconstituted catalyst is evaluated in the hydro-oxidation of propylene, as described hereinabove, with the results shown in Table 1, Ref 4. By using acid treatment without prior calcination, the regenerated catalyst recovered only 19 percent of the productivity of fresh reference catalyst. Thus, acid treatment without prior calcination is not a sufficiently effective method of regeneration.

EXAMPLE 1

A spent catalyst comprising gold on titanosilicate support bound with silica as described in experiment Ref 3 is regenerated by first calcining at 550° C. for 10 hours in air. Then, the calcined catalyst is treated by swirling in concentrated aqua regia (10 ml aqua regia per g catalyst) at ambient temperature for 50 minutes. Then, the acid solution is decanted from the material, and the acid-treated material is washed with water (27 ml acid solution per g) with agitation. The decantation and wash procedure are repeated, typically at least 4 times, until the pH of the wash rinse is greater than +5 to obtain a reclaimed titanosilicate. The reclaimed titanosilicate is dried at 80° C., re-impregnated to the point of incipient wetness with a methanol solution containing hydrogen tetrachloroaurate (III) trihydrate and sodium acetate at a concentration to deliver 1600 ppm Au and a 22:1 molar ratio of NaOAc:Au in the manner described in experiment Ref 1. The resulting reconstituted catalyst is evaluated in the hydro-oxidation of propylene in the manner noted hereinabove with the results shown in Table 1, Ex 1. The reconstituted catalyst, reconstituted by using calcination followed by acid treatment, exhibited a productivity comparable to fresh reference catalyst (Ref 1). The reconstitution is accomplished while maintaining acceptable propylene oxide selectivity and water/propylene oxide molar ratio.

EXAMPLE 2

Example Ex 1 is repeated as described hereinabove with the exception that the acid treatment is conducted with ultrasonic agitation rather than swirling. The regenerated catalyst is evaluated in the hydro-oxidation of propylene under the conditions described in experiment Ref 1 with the results shown in Table 1, Ex 2. It is seen that fully 96 percent of reference catalyst productivity is recovered when the spent catalyst is calcined first and then treated with concentrated aqua regia. The reconstitution is accomplished while maintaining acceptable propylene oxide selectivity and water/propylene oxide molar ratio.

EXAMPLE 3

A spent catalyst comprising gold and sodium on a titanosilicate support bound with silica, as described in experiment Ref 2, is regenerated by first calcining at 550° C. for 10 hours in air. Then, the calcined catalyst is treated by swirling in 65% aqueous solution of aqua regia (10 ml aqua regia per g catalyst) at ambient temperature for 38 minutes. The acid solution is decanted from the material and the same acid treatment repeated (65%, 38 minutes). Then, the acid solution is decanted from the material, and the acid-treated material is washed with water, dried at 80° C. and reconstituted as described in Example Ex 1. The regenerated catalyst is evaluated in the hydro-oxidation of propylene under the conditions described in experiment Ref 1 with the results shown in Table 1, Ex 3. It is seen that reconstituted catalyst exhibits a productivity somewhat better than that of the fresh reference catalyst, Ref 1. The reconstitution is accomplished while maintaining acceptable propylene oxide selectivity and even lower water/propylene oxide molar ratio (relative ratio 0.622).

EXAMPLE 4

Example Ex 3 is repeated as described hereinabove with the exception that the acid treatment employs two separate treatments using a 30% aqueous solution of aqua regia for 60 minutes each. Results are shown in Table 1, Ex 4. It is seen that the reconstituted catalyst exhibits a productivity similar to fresh catalyst Ref 1. The reconstitution is accomplished while maintaining acceptable propylene oxide selectivity and even lower water/propylene oxide molar ratio (relative ratio 0.768).

EXAMPLE 5

This experiment explores the effects of aqua regia on an oxidation catalyst comprising platinum deposited on a titanosilicate. Potassium hexachloroplatinate ($K_2PtCl_6$, 0.0205 g) is stirred into water (4 g), and the resulting solution is impregnated onto calcined titanosilicate (550° C. for 10 hours in air) to form the oxidation catalyst. The impregnated material is vacuum dried at 60° C. for 1 hour. A sample is taken and labeled "Fresh Catalyst." The remaining sample of catalyst is set aside while an aqua regia solution is prepared (30 grams concentrated hydrochloric acid, 10 grams concentrated nitric acid). The remaining sample of catalyst is poured into the aqua regia solution, and the mixture is swirled and set aside for 30 minutes. Afterwards, the acid solution is decanted from the mixture. Water (100 ml) is added to the acid-treated material, and the resulting mixture is swirled and set aside for 20 minutes. The water is then decanted. The washing is repeated four more times, and the last wash is set aside overnight. The final wash liquid is decanted from the titanosilicate, which is then dried in a vacuum oven at 60° C. to obtain a sample labeled "Reclaimed Titanosilicate." The fresh catalyst and reclaimed titanosilicate are analyzed by neutron activation analysis with the results shown in Table 2.

TABLE 2

| Sample ID | Si, % | Ti, % | Pt, % |
|---|---|---|---|
| Fresh Catalyst | 44 ± 2 | 0.500 ± 0.009 | 0.100 ± 0.007 |
| Reclaimed TS[1] | 44 ± 2 | 0.498 ± 0.009 | ND[2] @ 0.007 |

[1]TS = Titanosilicate
[2]ND = Non-detectable

From Table 2 it is seen that the reclaimed titanosilicate has essentially identical silicon and titanium concentrations as that of the fresh catalyst (i.e., fresh titanosilicate). Accordingly, the Si/Ti atomic ratio of the reclaimed titanosilicate is essentially identical to that of the fresh catalyst. Whereas the fresh catalyst contains 0.1 weight percent catalytic metal (Pt), the reclaimed titanosilicate has no detectable catalytic metal (Pt) present. Accordingly, the process of this invention removes catalytic metal, but does not remove the titanium present in the titanosilicate lattice structure.

What is claimed is:

1. A process of reconstituting an active oxidation catalyst from a deactivated oxidation catalyst comprising a titanosilicate having deposited thereon one or more catalytic metals and, optionally, one or more promoter metals, the process comprising:
    (a) pretreating the deactivated oxidation catalyst comprising a titanosilicate having deposited thereon one or more catalytic metals and, optionally, one or more promoter metals with an oxidant;
    (b) contacting the oxidant-treated oxidation catalyst with acid under conditions sufficient to obtain a titanosilicate substantially free of the one or more catalytic metals and optional one or more promoter metals;
    (c) washing the titanosilicate from step (b) under conditions sufficient to remove residual acid and reclaim the titanosilicate;
    (d) optionally, drying the reclaimed titanosilicate;
    (e) optionally, calcining the reclaimed titanosilicate obtained from step (c) or (d); and
    (f) depositing one or more catalytic metals and optionally one or more promoter metals onto the reclaimed titanosilicate under conditions sufficient to obtain the reconstituted oxidation catalyst.

2. The process of claim 1 wherein the one or more catalytic metals are selected from the group consisting of gold, silver, the lanthanide metals, the platinum group metals, and mixtures thereof.

3. The process of claim 2 wherein the catalytic metal comprises gold, silver, palladium, or a mixture thereof.

4. The process of claim 2 wherein the catalytic metal comprises gold or gold in combination with silver, a platinum group metal, a lanthanide metal, or a mixture thereof.

5. The process of claim 1 wherein the one or more catalytic metals are present in the deactivated catalyst in a concentration greater than about 0.001 and less than about 20 weight percent, based on the weight of the catalytic metal(s) and the titanosilicate.

6. The process of claim 1 wherein the catalyst further comprises one or more promoter metals selected from the group consisting of Group 1, Group 2, the lanthanides, the actinides, and mixtures thereof.

7. The process of claim 6 wherein the one or more promoter metals are selected from lithium, sodium, potassium, rubidium, cesium, magnesium, calcium, barium, erbium, lutetium, and mixtures thereof.

8. The process of claim 1 wherein the one or more promoter metals are present in the deactivated catalyst in a concentration greater than about 0.001 and less than about 20 weight percent, calculated as metal and based on the total weight of the catalyst.

9. The process of claim 1 wherein the titanosilicate is a crystalline porous titanosilicate selected from TS-1, TS-2, Ti-beta, Ti-ZSM-12, Ti-ZSM-48, Ti-MCM-41, and titanosilicates having a plurality of titanium coordination sites.

10. The process of claim 1 wherein the catalyst is bound to or extruded with a second support.

11. The process of claim 1 wherein the oxidant is selected from the group consisting of oxygen, ozone, nitrogen oxides, and hydrogen peroxide.

12. The process of claim 1 wherein the treatment with oxidant is conducted in a gas phase with a gaseous oxidant at a temperature greater than about 250° C. and less than about 850° C.; or alternatively, is conducted with an oxidant in liquid phase at a temperature greater than about 20° C. and less than about 120° C.

13. The process of claim 1 wherein the acid is selected from the group consisting of hydrochloric, nitric, sulfuric, phosphoric acid, and mixtures thereof; and the acid is provided as an aqueous acid solution.

14. The process of claim 13 wherein the acid is aqua regia.

15. The process of claim 13 wherein the pH of the acid solution is less than about +5; and the volume (ml) of acid solution used per gram deactivated catalyst is greater than about 1 ml/g and less than about 100 ml/g.

16. The process of claim 13 wherein the temperature of the acid treatment is greater than about 10° C. and less than about 100° C.; and optionally, wherein the contact time is greater than about 1 minute and less than about 24 hours.

17. The process of claim 13 wherein the acid-treated titanosilicate is separated from the aqueous acid solution; and optionally, recovered aqueous acid solution is worked-up to recover catalytic metal(s) and optional promoter metal(s).

18. The process of claim 1 wherein the titanosilicate from step (b) is washed with a solvent, in a quantity of solvent greater than about 1 milliliter and less than about 1,000 ml per gram titanosilicate, at a temperature greater than about 10° C. and less than about 100° C.; and wherein optionally, the wash is repeated until the pH of recovered wash liquid is greater than about +5.

19. The process of claim 1 wherein the reclaimed titanosilicate is dried at a temperature greater than about 20° C. and less than about 150° C.

20. The process of claim 1 wherein the reclaimed titanosilicate is calcined in an atmosphere of nitrogen containing from about 0 to about 30 percent oxygen, by volume, at a temperature greater than about 150° C. and less than about 900° C.

21. The process of claim 1 wherein the catalytic metal(s) deposited on the reclaimed titanosilicate are selected from gold, silver, the lanthanides, the platinum group metals, and combinations thereof; and wherein the optional promoter metal(s) are selected from Group 1, Group 2, the lanthanides, the actinides, and mixtures thereof.

22. A process of reconstituting an active oxidation catalyst comprising titanosilicate TS-1 having deposited thereon gold and at least one promoter metal selected from lithium, sodium, potassium, rubidium, cesium, magnesium, calcium, barium, erbium, lutetium, and mixtures thereof; the reconstitution process comprising:
   (a) pretreating with oxygen a deactivated oxidation catalyst comprising a titanosilicate TS-1 having deposited thereon gold and at least one promoter metal selected from lithium, sodium, potassium, rubidium, cesium, magnesium, calcium, barium, erbium, lutetium, and mixtures thereof, at a temperature greater than about 250° C. and less than about 850° C.;
   (b) contacting the oxygen-treated deactivated catalyst with aqua regia under conditions sufficient to remove the gold and optional promoter metal(s);
   (c) washing the titanosilicate obtained from step (b) with water to remove residual acid;
   (d) optionally, drying the washed titanosilicate at a temperature greater than about 20° C. and less than about 150° C.;
   (e) optionally, calcining the reclaimed titanosilicate obtained from step (c) or (d) in an atmosphere of nitrogen containing from 0 to about 30 percent oxygen by volume, at a temperature greater than about 150° C. and less than about 900° C. to obtain a reclaimed titanosilicate; and
   (f) depositing gold and, optionally, one or more promoter metals selected from the group consisting of lithium, sodium, potassium, rubidium, cesium, magnesium, calcium, barium, erbium, lutetium, and mixtures thereof, onto the reclaimed titanosilicate TS-1, under conditions sufficient to form the reconstituted oxidation catalyst.

23. A process of reclaiming a titanosilicate from a deactivated oxidation catalyst comprising:
   (a) treating a deactivated oxidation catalyst comprising a titanosilicate having deposited thereon one or more catalytic metals and, optionally, one or more promoter metals with an oxidant;
   (b) contacting the oxidant-treated oxidation catalyst with acid under conditions sufficient to remove the one or more catalytic metals and the optional one or more promoter metals from the titanosilicate;
   (c) washing the titanosilicate from step (b) under conditions sufficient to remove residual acid from the titanosilicate;
   (d) optionally, drying the washed titanosilicate; and
   (e) optionally, calcining the titanosilicate obtained from step (c) or (d); so as to obtain a reclaimed titanosilicate.

24. The process of claim 23 wherein the catalytic metal is gold or gold in combination with silver, a platinum group metal, a lanthanide metal, or a mixture thereof; and wherein optionally, the catalyst also comprises one or more promoter metals selected from the group consisting of lithium, sodium, potassium, rubidium, cesium, magnesium, calcium, barium, erbium, lutetium, and mixtures thereof.

* * * * *